March 13, 1962 D. G. BEREMAND 3,024,803
REGULATOR VALVE
Filed June 26, 1956 3 Sheets-Sheet 2
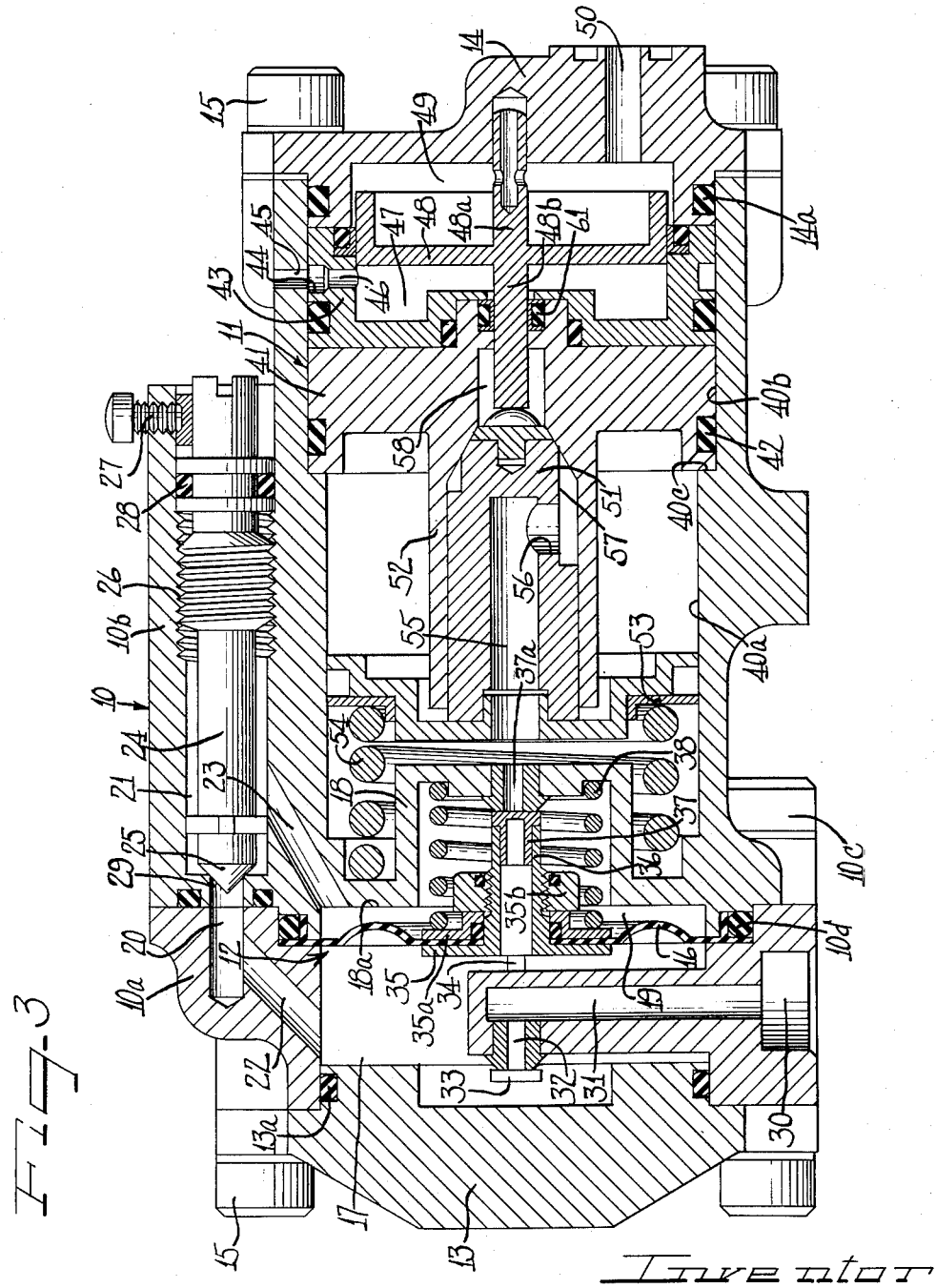
Inventor
Donald G. Beremand March 13, 1962 — D. G. BEREMAND — 3,024,803
REGULATOR VALVE
Filed June 26, 1956 — 3 Sheets-Sheet 3
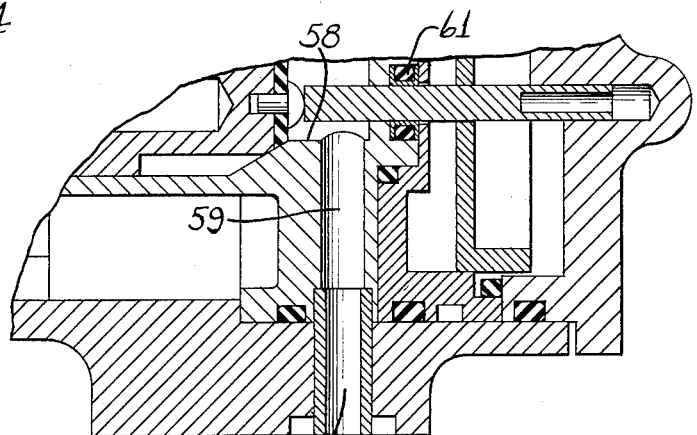
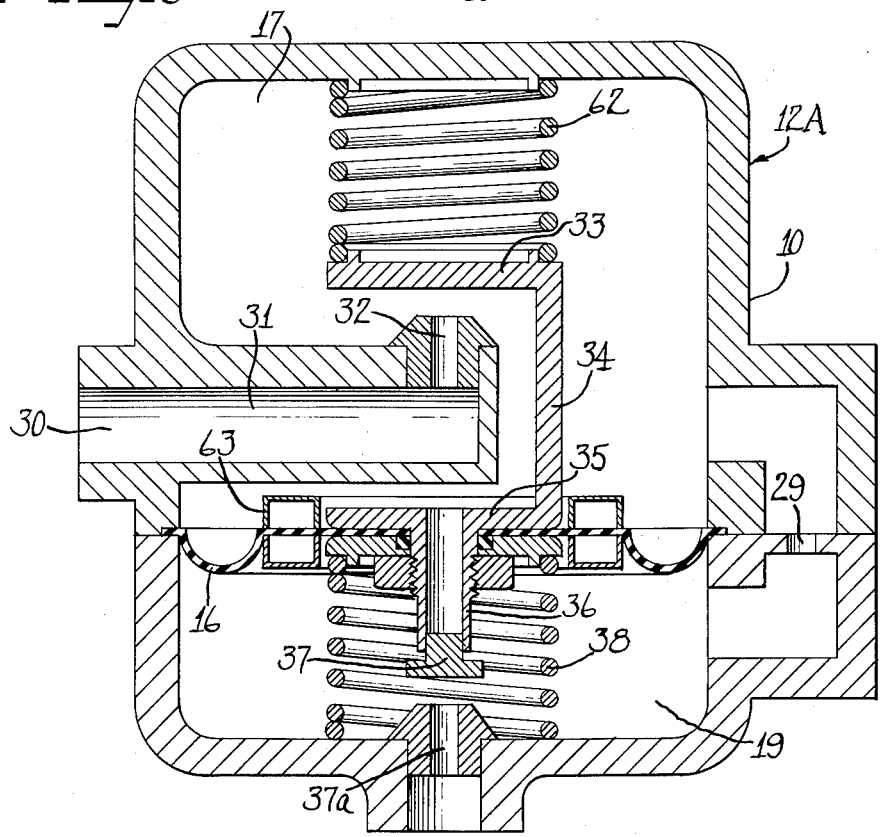
Inventor
Donald G. Beremand 3,024,803
REGULATOR VALVE
Donald G. Beremand, Bay Village, Ohio, assignor to Thompson Ramo Wooldridge Inc., a corporation of Ohio
Filed June 26, 1956, Ser. No. 593,992
8 Claims. (Cl. 137—501)

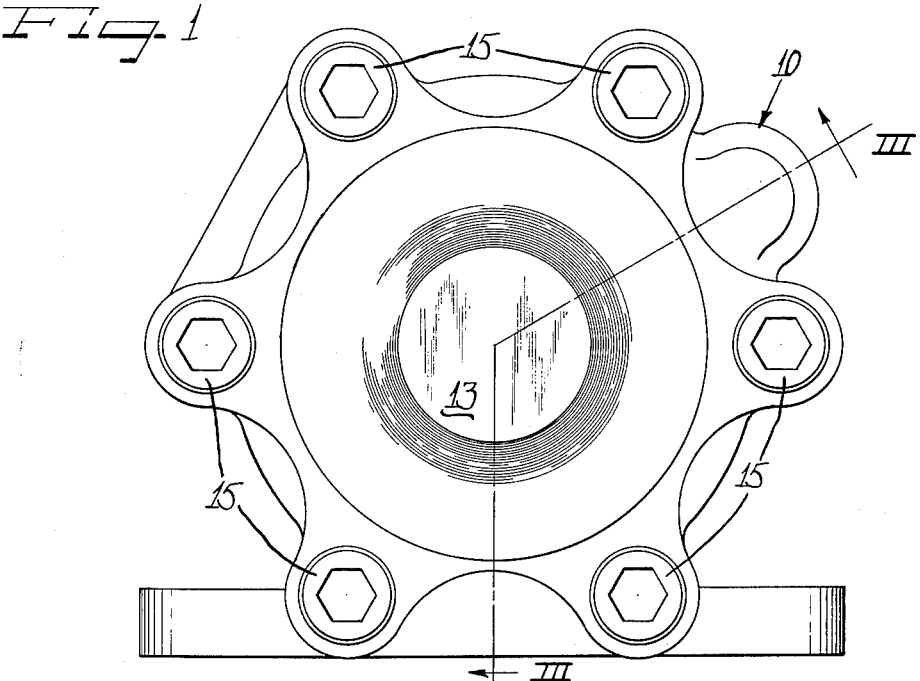
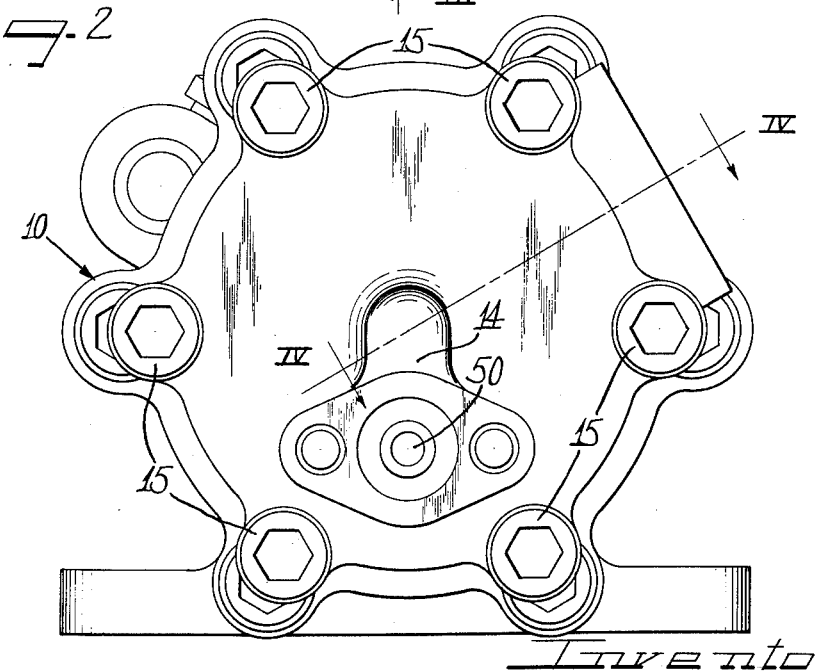

This invention relates generally to flow control apparatus, and more particularly to balanced regulator valves for maintaining the flow at constant value. The invention is particularly useful in systems which require a carefully controlled fluid flow from a source having a widely variable pressure and operate under high g-loads, such as a rocket fuel system wherein the fuel supply is originally under extremely high pressure and the pressure diminishes to a low value as the fuel is used, although other uses and purposes may be apparent to one skilled in the art.

In systems which require such a carefully controlled fluid flow from a source having a widely variable pressure, difficulty has been encountered in providing a regulator valve for such conditions in that those valves which were developed have been unduly complex and bulky, expensive to manufacture, and provided with numerous slide fitting parts. And in rocket engines, it has been appreciated that the operating components including the fuel flow regulator valves, are subjected to extreme accelerational or deceleration effects, herein termed "g-loads," which naturally inhibit the smooth operation of the valves.

In the present invention a pressure balanced regulator valve is provided which is void of any slide fitting parts. The valve includes a diaphragm, wherein the pressure unbalance on opposite sides of the diaphragm is eliminated by the utilization of a plurality of pressure drop orifices and by the provision of an overhanging impingement wall on the diaphragm coacting with one of the orifices. This arrangement eliminates a force unbalance so that only a small spring load need be employed to give the desired pressure differential for operation. Thus, the unbalanced forces are balanced out so that the mass of the spring can be kept relatively small.

When the valve may be subjected to g-loads in both the normal and inverted position, a float on the diaphragm and a double spring arrangement may be employed to displace fluid and balance the valve so that the total mass of the displaced fluid is equal to the total effective mass of the diaphragm.

Accordingly, it is an object of this invention to provide a flow control valve which obviates the above named difficulties.

It is also an object of this invention to provide a valve capable of operation over a large pressure drop range and under high g-load conditions with good accuracy.

Another object of this invention is to provide a regulator valve which effects a carefully controlled fluid flow from a source having a widely variable pressure, wherein the valve is pressure balanced and provided with means which eliminate any accelerational sensitivity of the valve.

A further object of this invention resides in the provision of a pressure balanced regulator valve having a diaphragm, wherein pressure unbalance on opposite sides of the diaphragm is eliminated by the utilization of a plurality of pressure drop orifices and by provision of overhanging impingement walls on the diaphragm coacting with the orifices.

Still another object of this invention is in the provision of a regulator valve that is capable of providing a carefully controlled fluid flow from a source having an initially extremely high fluid pressure that diminishes to a low value.

Another object of this invention is in the provision of a pressure balanced regulator valve that is so constructed as to be substantially unaffected by gravitational effects.

A further object of this invention is to provide a combination balanced regulator and shut-off valve.

Other objects, features and advantages of the invention will be apparent from the following detailed disclosure, taken in conjunction with the accompanying sheets of drawings, wherein like reference numerals refer to like parts, in which:

On the drawings—

FIGURE 1 is an end elevational view of a valve according to the invention;

FIGURE 2 is an end elevational view of the valve in FIGURE 1 showing the opposite end thereof;

FIGURE 3 is a sectional view, with parts in elevation, taken substantially along line III—III of FIGURE 1;

FIGURE 4 is an enlarged fragmentary sectional view showing a detail of the invention and taken substantially along line IV—IV in FIGURE 2; and FIGURE 5 is a more or less diagrammatic sectional view of a modified valve and showing only the regulator section.

As shown on the drawings:

Referring particularly to FIGURE 3, the shut-off and regulator valve of this invention includes a casing or housing 10 which encloses on one end a shut-off valve for on-off control of the flow and generally designated by the numeral 11, and at the other end a flow regulating valve, generally designated by the numeral 12, for maintaining the flow at a constant value over a wide operating range.

The casing 10 is generally hollow and closed at opposite ends by heads 13 and 14 which are secured to the casing by suitable fasteners, such as indicated by the numeral 15. In order to prevent leakage at the heads, O-rings 13a and 14a are provided for sealingly engaging the heads to the casing. The casing 10 is sectional, and includes sections 10a and 10b suitably secured together by fasteners 10c and in sealing relationship by an O-ring 10d.

Between the mating faces of the casing sections 10a and 10b is secured the peripheral edge of a flexible diaphragm 16, which defines with the casing section 10a and head 13 an upper or inlet chamber 17. A cup-shaped partition 18, integrally connected to the inner walls of the casing section 10b by an annular web 18a defines with the underside of the diaphragm 16 a lower or outlet chamber 19. Outwardly from the chambers is provided a passageway 20 in the casing section 10a connecting with an enlarged passageway 21 in the casing 10b. The passageway 20 communicates with the inlet chamber 17 through a passageway 22. The enlarged passage 21 outward of the chambers communicates with the outlet chamber 19 through a passageway 23, thereby effectively intercommunicating the chambers 17 and 19.

Carried within the passageway 21 is an adjustable shank 24 having a conical end 25 coacting with the outlet end of the passageway 20 to restrict same. A portion of the shank 24 is externally threaded to threadedly engage the passageway 21 at 26 for adjusting the pressure drop orifice defined by the conical end 25 and the outlet end of the passageway 20. A clamp and set screw arrangement 27 securely holds the shank 24 in adjusted position, and an O-ring assembly 28 prevents leakage outward of the passageway 21. Thus, a pressure drop orifice 29 is defined between the chambers 17 and 19.

The valve casing section 10a is provided with an inlet 30, which also serves as an inlet to the flow regulator 12. The inlet 30 communicates with a passageway 31 which leads to the center of the inlet chamber 17 and communicates at right angles with a pressure drop orifice or variable restriction 32. The outlet of this pressure drop orifice directs the fluid flow toward the top of the casing or the end head 13. Fluid under extremely high pressure, for example, 3000 lbs. per square inch, enters the valve inlet 30, and this extremely high pressure is lowered considerably by the pressure drop orifice 32, so that the pressure of the fluid within the inlet chamber 17 is substantially lower than the inlet pressure. As the fluid leaves the pressure drop orifice 32, it is projected against an overhanging impingement plate 33 that is substantially parallel with the diaphragm 16.

This impingement plate 33 is fastened to the diaphragm by an extending leg 34 which is preferably integral with a centrally apertured annular member 35 that is secured against the one side of the diaphragm 16. Integrally extending from the plate 35 is a tubular section 36 which is closed at its outer end by a plug 37. A centrally apertured retaining plate 35a bears against the opposite side of the diaphragm to coact with the plate 35 in rigidly holding the tubular section on the diaphragm. A nut 35b is threadedly received on the tubular section to hold the plates together in clamping relation with the diaphragm. It will be noted that the tubular member extends within the outlet chamber 19 and the closed end thereof coacts with a pressure drop orifice 37a to define a second variable restriction. Because of the pressure drop orifice 29 between the chambers 17 and 19, the fluid pressure in the chamber 19 is less than that in the chamber 17.

A spring 38 having a small spring load is interposed between the bottom of the chamber 19, which is defined by the partition 18, and the retaining plate 35a to give a desired pressure differential for valve operation. Due to the pressure drop orifice and the overhanging impingement wall 33, the spring load of the spring 38 need not be very great. Actually the use of the impingement wall 33 balances off an unbalanced pressure force thereby allowing the mass of the spring to be kept relatively small.

In operation of the flow regulator 12, an increase in fluid flow, resulting from a higher pressure differential across the valve between the inlet 30 and the outlet of the orifice 37a, results in a higher pressure drop across the metering orifice 29. This higher pressure differential acts on the diaphragm 16 which moves down, compressing the spring 38, and decreases the size of the two matched variable restrictions (the orifice 32 and impingement wall 33 in the chamber 17, and the orifice 37a and the plug 37 in the chamber 19). This restores the flow close to its original value, with the pressure at the inlet 30 minus the pressure in the chamber 17 plus the pressure in the chamber 19 minus the pressure at the outlet end of the orifice 37a having increased about the same as the pressure at the inlet 30 minus the pressure at the outlet 37a, the pressure in the inlet chamber 17 minus the pressure in the outlet chamber 19 having been restored close to its original value. Preferably, the valve will be made so that the area of the orifices 32 and 37a are equal and so that the distance between the outlet of the orifice 32 and the impingement wall 33 and between the inlet to the orifice 37a and the plug 37 are equal; then since the same flow is passing through the restriction in the chamber 17 and the restriction in the chamber 19, neglecting fluid compressibility, the pressure drop through the restriction in the chamber 17 must equal the pressure drop through the restriction in the chamber 19. In addition, these pressure drops act on equal areas and in opposite direction. Thus, these pressure forces are balanced so that they have no net effect on the diaphragm. The load of the spring 38 can now be made relatively small since there is no need to minimize the effects of an unbalanced pressure force. Thus, a valve of this design is capable of operation over a large pressure drop range and under high acceleration conditions with good accuracy.

Now referring to the shut-off valve 11, shown more clearly in FIGURES 3 and 4, it will be understood that this part of the valve provides for on-off control of the flow. This shut-off valve must seal in the shut-off position against an extremely high pressure differential, for example, as high as 3000 lbs. per square inch with no leakage for long periods of times. At this corresponding end of the casing 10b, a pair of communicating counter bores 40a and 40b defines a shoulder 40c therebetween. Bearing directly against this shoulder 40c is a body member 41 received within the bore 40b and in sealing relationship therewith by virtue of the O-ring 42. Also received within the bore 40b and intimately engaging one side of the body member 41 is a cup-shaped retainer 43 having a circumferential annular groove 44. The groove 44 communicates with an aperture 45 extending through the casing 10b and to the atmosphere on one side and with an aperture 46 extending radially through the upstanding portion of the member 43 to communicate with a chamber 47. In other words, the chamber 47 is at all times communicable with the atmosphere. Slidably received within the open end of the cup-shaped member 43 is an actuating piston 48 which coacts with the cup-shaped member 43 to define the chamber 47 and defines on the opposite side a pressure chamber 49. The pressure chamber 49 is provided with an inlet 50 extending through the end head 14 and which is suitably connected to a pneumatic pressure source, such as the combustion chamber of a gas expanding engine.

One end of the piston 48 is provided with a guide stem 48a which is slidably received in a bore in the end head 14, and the other end is provided with an actuating stem 48b which is slidably received within apertures formed in the cup-shaped plate 43 and the body member 41. The very end of the actuating stem 48b is adapted to bear against one end of a tapered poppet valve member 51 having a conical valve face coacting with a conical valve seat formed in a tubular extension 52 integral and extending from one side of the body member 41. The valve member 51 is slidably received within this tubular extension and bears against a spring retaining plate arrangement 53 which engages a spring 54 that constantly urges the valve member 51 into seating relationship with the valve seat formed on the tubular extension 52.

Flow of fluid leaving the orifice 37a passes through the plate arrangement 53 which is centrally apertured and into a longitudinal bore 55 formed in the valve member 51. A radially extending passageway 56 connects the bore 55 with a cut away portion 57 of the valve member 51 that permits flow of fluid into a chamber 58 formed in the valve body 41 when the valve member 51 is unseated. As seen most clearly in FIGURE 4 a radially extending passageway 59 leads from the chamber 58 to an outlet 60 in the casing section 10b. Additionally, the tapered poppet valve member 51 is held against its seat by the pressure differential between the pressure at the head of the sliding valve member 51 and the pressure at the outlet passageway 59, this differential acting on the valve member 51.

In operation, when signal pressure is referenced to the one side of the actuating piston 48 in communication with the chamber 49 via the inlet 50, the actuating piston will open the poppet valve and unseat the valve member 51 when the pressure differential between the signal pressure and the atmosphere times the area of the actuating piston 48 exceeds the spring force plus the differential pressure between the head of the valve member 51 and the outlet chamber 58 times the area of the poppet. In closing, the poppet valve 51 will not close until the signal pressure minus the atmospheric pressure times the actuating piston area becomes less than the spring force alone, since in the open position the poppet valve presents no significant restriction to flow and the pressure at the head of the poppet valve 51 equals the pressure at the outlet chamber 58. During flow an O-ring backed Teflon seal 61 prevents leakage along the actuating piston rod 48b to the back of the actuating piston.

It will be understood that this shut-off valve is capable of obtaining a positive seal during the shut-off period, since the only sliding seal which might be subjected to a slight seepage is located downstream of the poppet type shut-off. In the application of the present invention, the period of flow will in most cases be short and a slight seepage through the Teflon seal 61 during flow is not objectionable. Since the poppet valve member 51 is not firmly attached to the actuating piston 48, accurate concentricity of the valve seat with the actuating piston is not required.

Referring now to FIGURE 5, a modified flow regulator 12a, in schematic form, is illustrated which may be substituted for the flow regulator 12 in FIGURE 3. Inasmuch as the parts in this embodiment are quite similar to that of the embodiment in FIGURE 3, like numerals will be used to identify like parts wherever possible. In this embodiment, a double spring arrangement is employed wherein a second spring 62, of equal force and mass as spring 38, is positioned in the inlet chamber 17 between the impingement wall 33 and the adjacent casing wall of the casing 10. Additionally, a float 63 is carried on the diaphragm 16, which serves to displace liquid and balance the diaphragm so that the total mass of the displaced liquid is equal to the total effective mass of the diaphragm and members attached thereto. This double spring arrangement and float are employed only when the valve may be subjected to g-loads in both the normal and inverted positions, wherein the weight of the spring 38 is balanced by the spring 62. The spring 62 will, of course, have the same mass as the spring 38, but of a different (lighter) load. It will be understood that this flow regulator 12a will operate in a manner similar to that of the flow regulator 12 in FIGURE 3, but being capable of being operated in an inverted position, without an effect on regulated flow.

From the foregoing, it is seen that the instant invention provides a compact flow regulator valve which provides on-off control of the flow and maintains the flow at a constant value over a wide range of pressures and under high accelerations.

It will be understood that modifications and variations may be effected without departing from the scope of the novel concepts of the present invention, but it is understood that this application is to be limited only by the scope of the appended claims.

I claim as my invention:

1. A balanced regulator valve having a housing with an inlet and an outlet, a valve carrying diaphragm in said housing defining with the walls thereof a pair of fluid chambers, an orificed member communicating with said inlet and opening into one of said chambers, an impinging member secured to said diaphragm and disposed in the flow path from said orificed member, a passage intercommunicating said chambers, said passage having a pressure drop orifice therein, a biasing member in said other chamber acting against said diaphragm, and a second orificed member communicating with said outlet and opening into the other of said chambers in confronting relation to the valve on the diaphragm.

2. A flow control valve including a casing having an inlet and an outlet, a fluid compartment in said casing, a diaphragm in said compartment dividing same and defining with the casing walls first and second fluid chambers, said inlet disposed to discharge all of its flow into said first chamber and having an orifice means upstream of said first chamber effecting a pressure drop whereby pressure in said first chamber will be appreciably less than the pressure at said inlet, said outlet intercommunicable with said second chamber and having an orifice means effecting a pressure drop, a passageway in said casing intercommunicating said chambers, means on said diaphragm for regulating the fluid flow through each of said orifices, and a spring urging said regulating means away from said outlet.

3. A pressure balanced regulator valve including a casing having an inlet and an outlet, a compartment in said casing, a diaphragm in said compartment dividing same and defining with said casing walls first and second fluid chambers, a passageway in said casing intercommunicating said chambers, an impingement wall in said first chamber attached to said diaphragm, an orifice means at the inner end of said inlet effecting a pressure drop and directing a stream of fluid against said impingement wall to counteract a portion of the pressure load on the side of the diaphragm in said first chamber, a second orifice means in said second chamber at the mouth of said outlet and facing said diaphragm, a plate on the side of said diaphragm open to said second chamber in overlying relationship to said second orifice means for controlling fluid flow therethrough in response to the pressure in said first chamber, and biasing means in said second chamber acting to urge said plate away from said second orifice means.

4. A pressure balanced regulator valve including a casing having an inlet and an outlet, a compartment in said casing, a diaphragm in said compartment dividing same and defining with said casing walls first and second liquid chambers, a passageway in said casing intercommunicating said chambers, an impingement wall in said first chamber attached to said diaphragm, an orifice means at the inner end of said inlet effecting a pressure drop and directing a stream of liquid against aid impingement wall to counteract a portion of the pressure load on the side of the diaphragm in said first chamber, a second orifice means in said second chamber at the mouth of said outlet and facing said diaphragm, a plate on the side of said diaphragm open to said second chamber in overlying relationship to said second orifice means for controlling liquid flow therethrough in response to the pressure in said first chamber, buoyant means connected to said diaphragm for balancing the valve, said buoyant means, said diaphragm, said plate, and said impingement wall having a combined effective mass substantially equal to the mass of the liquid displaced by said buoyant means, said diaphragm, said plate, and said impingement wall, and biasing means in said second chamber acting to urge said plate away from said second orifice means, whereby the diaphragm position does not change in response to gravity when the valve is inverted.

5. A pressure balanced regulator valve including a casing having an inlet and an outlet, a compartment in said casing, a diaphragm in said compartment dividing same and defining with said casing walls first and second fluid chambers, a passageway in said casing intercommunicating said chambers, an impingement member in said first chamber attached to said diaphragm, an orifice means at the inner end of said inlet effecting pressure drop and directing a stream of fluid against said impingement member to counteract a portion of the pressure load on the side of the diaphragm in said first chamber, a second orifice means in said second chamber at the mouth of said outlet and facing said diaphragm, a plate on the side of said diaphragm open to said second chamber in overlying relationship to said second orifice means for controlling fluid flow therethrough in response to the pressure in said first chamber, a first spring between said casing and said plate for urging the latter away from said second orifice means, and a second spring in said first chamber between said casing and impingement member of the same mass as said first spring of a different load.

6. A pressure balanced regulator valve including a casing having an inlet and an outlet, a compartment in said casing, a diaphragm in said compartment dividing same and defining with said casing walls first and second fluid chambers, a passageway in said casing intercommunicating said chambers, a pressure drop orifice in said passageway, an impingement wall in said first chamber attached to said diaphragm, an orifice means at the inner end of said inlet effecting a pressure drop and directing a stream of fluid against said impingement wall to counteract a portion of the pressure load on the side of the diaphragm in said first chamber, a second orifice means in said second chamber at the mouth of said outlet and facing said diaphragm, a plate on the side of said diaphragm open to said second chamber in overlying relationship to said second orifice, means for controlling fluid flow therethrough in response to the pressure in said first chamber, and biasing means in said second chamber acting to urge said plate away from said second orifice means.

7. A valve for supplying an accurate feed of liquid subject to a wide range of pressure regardless of the position or state of movement of the valve body which comprises a housing, a diaphragm dividing the housing into inlet and outlet compartments, said compartments having an inlet and an outlet port respectively, a valve seat communicating with said outlet port, a valve member carried by the diaphragm in engageable relation to said seat for controlling flow to the outlet, buoyant means connected to said diaphragm for balancing the valve, said buoyant means, said diaphragm and said valve member having a combined effective mass substantially equal to the mass of the liquid displaced by said buoyant means, said diaphragm and said valve member, an orificed passage connecting the compartments to maintain a pressure differential therebetween for biasing the diaphragm in one direction, and spring means of equal mass but of different rates acting on opposite sides of the diaphragm to oppositely bias the diaphragm.

8. A regulator valve including a casing having an inlet and an outlet, a compartment in said casing, a diaphragm in said compartment dividing same and defining with the casing walls first and second fluid chambers, a rigidly disposed passageway defined by said casing intercommunicating said chambers, a pressure drop orifice in said passageway, a first restriction between said inlet and said first chamber, a second restriction between said outlet and said second chamber, valve means attached to said diaphragm and registering with each of said restrictions, said valve means being operative in response to diaphragm movement to simultaneously effect variation of the effective size of said restrictions in the same direction, and a spring in said second chamber acting to urge the diaphragm into said first chamber, whereby said valve is capable of operation over a large pressure drop range with good accuracy.

References Cited in the file of this patent

UNITED STATES PATENTS

| | | |
|---|---|---|
| 171,236 | McMillan | Dec. 21, 1875 |
| 172,163 | Peebles | Jan. 11, 1876 |
| 991,641 | Plantinga | May 9, 1911 |
| 1,883,690 | Gilgenberg | Oct. 18, 1932 |
| 2,472,056 | Otis | May 31, 1949 |
| 2,552,552 | Head | May 15, 1951 |
| 2,659,425 | Ifield | Nov. 17, 1953 |
| 2,704,552 | De Vertevil | Mar. 22, 1955 |
| 2,807,144 | St. Clair | Sept. 24, 1957 |

FOREIGN PATENTS

| | | |
|---|---|---|
| 2,524 | Great Britain | Apr. 18, 1891 |